United States Patent
Narasimhamurthy et al.

(10) Patent No.: US 7,213,081 B2
(45) Date of Patent: May 1, 2007

(54) DYNAMIC DETERMINATION OF MEMORY MAPPED INPUT OUTPUT RANGE GRANULARITY FOR MULTI-NODE COMPUTER SYSTEM

(75) Inventors: Prabhunandan B. Narasimhamurthy, San Jose, CA (US); Yukio Nishimura, Ishikawa-ken (JP); Sudheer Miryala, San Jose, CA (US); Kazunori Masuyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1162 days.

(21) Appl. No.: 10/122,043

(22) Filed: Apr. 11, 2002

(65) Prior Publication Data

US 2003/0005070 A1   Jan. 2, 2003

Related U.S. Application Data

(60) Provisional application No. 60/301,955, filed on Jun. 29, 2001.

(51) Int. Cl.
*G06F 3/00* (2006.01)
(52) U.S. Cl. .............................. 710/2; 711/1
(58) Field of Classification Search ........... 710/2; 711/1
See application file for complete search history.

(56) References Cited

U.S. PATENT DOCUMENTS

| | | | | |
|---|---|---|---|---|
| 5,999,743 A * | 12/1999 | Horan et al. | ................... | 710/56 |
| 6,011,791 A * | 1/2000 | Okada et al. | ............... | 370/352 |
| 6,170,025 B1 * | 1/2001 | Drottar et al. | ................ | 710/48 |
| 6,418,492 B1 * | 7/2002 | Papa et al. | ................... | 710/302 |
| 6,496,740 B1 * | 12/2002 | Robertson et al. | ............. | 710/2 |
| 6,678,271 B1 * | 1/2004 | Flinsbaugh | ................. | 370/392 |
| 2002/0152334 A1 * | 10/2002 | Holm et al. | ................... | 710/2 |
| 2003/0037178 A1 * | 2/2003 | Vessey et al. | ............... | 709/319 |

* cited by examiner

*Primary Examiner*—Donald Sparks
*Assistant Examiner*—Ernest Unelus
(74) *Attorney, Agent, or Firm*—Fenwick & West LLP

(57) ABSTRACT

A method and system enables dynamic support of memory mapping devices in a multi-node computer system. One of central process unit (CPU) nodes determines a total amount of MMIO address spaces that are needed for all MMIO devices and generates an optimized granularity to support the total amount of MMIO address spaces. Based on the granularity, a CPU node controller configures MMIO range registers of the interconnect and other MMIO registers in IO nodes and CPU node controllers to support dynamic changes of MMIO address space requirements of the system.

12 Claims, 4 Drawing Sheets

DYNAMIC DETERMINATION OF MEMORY MAPPED INPUT OUTPUT RANGE GRANULARITY FOR MULTI-NODE COMPUTER SYSTEM

RELATED APPLICATION

This application claims priority under 35 U.S.C. § 119(e) from co-pending U.S. Provisional Patent Application Ser. No. 60/301,955, entitled "Algorithm For Dynamically Determining The Memory Mapped Input Output Range Granularity For A Multi-Node Computer System," filed on Jun. 29, 2001, by Prabhunandan B. Narasimhamurthy, et al, which is incorporated by reference in its entirety herein.

FIELD OF THE INVENTION

The present invention relates generally to an interconnect-based multi-node computer system, in particular, to supporting memory mapped Input Output (MMIO) processing for a multi-node computer system.

BACKGROUND OF THE INVENTION

A multi-node computer system typically contains a plurality of central processing units (CPU) node, a plurality of interconnects, and a plurality of input output (IO) nodes. Each IO node is coupled to multiple IO devices, which may be conventional peripheral devices, such as peripheral component interconnect (PCI), small computer system interface (SCSI) type devices. Such multi-node computer system may perform complex computing tasks such as interacting simultaneously with a large number of IO devices.

In a multi-node computer system, some or all of the IO devices may be memory-mapped IO (MMIO) devices. The memory-mapped IO devices are connected to address and data lines within the IO nodes, and the CPU nodes in a manner similar to the connection of memory devices. Whenever the IO nodes, or the CPU nodes read or write the addresses associated with the IO devices, the IO nodes or the CPU nodes can transfer data to or from the IO devices. One of the advantages of such memory-mapped IO devices is that processors in the CPU nodes or the interconnect can use any single instruction that accesses their memory spaces to operate upon data that are transmitted at IO device ports rather than first moving the data into processors, manipulating the data and then writing the data back to the IO device port. By doing so, memory-mapped IO devices typically reduce computation burdens on the processors.

To support these memory-mapped IO devices, components in the multi-node computer system, including the CPU nodes and the IO nodes, need to allocate large amount of physical address space in their memory units. In a conventional multi-node computer system, the interconnect has only a fixed number of MMIO range registers to specify the range of address spaces that are allocated for memory-mapped IO devices coupled to a given IO node. Such interconnect registers are typically "base" and "size" types of registers, which requires a base and size declaration for each CPU node and IO node coupled to the interconnect. If there are n nodes in the computer system, it will require n Base registers and n Size registers. The conventional "base" and "size" type registers thus consume substantial resources.

Moreover, the conventional "base" and "size" type registers fail to provide scalability for memory-mapping in a multi-node computer system. When the IO nodes connect to a large number of IO devices, the MMIO address space requirement for the multi-node computer system can be an arbitrarily large number. It would be very inefficient for a programmer to configure every MMIO range register to specify the base and the size in the interconnect for each IO device.

Therefore, it is desirable to provide an efficient and scalable method and system to dynamically support MMIO devices in an interconnect-based multi-node computer system.

SUMMARY OF THE INVENTION

In accordance with the present invention, there is provided a method and system for dynamically supporting memory mapped IO (MMIO) devices in an interconnect-based multi-node computer system. In particular, the method and system support arbitrarily large amounts of MMIO address space with a fixed number of interconnect range registers and efficiently uses allocated MMIO memory space in a multi-node computer system. In one embodiment, the method includes: (1) dynamically determining a total amount of MMIO address space requirement for all MMIO devices; (2) calculating an optimized value of a MMIO range granularity to support the total MMIO address space requirement; (3) programming MMIO registers of the interconnect based on the determined granularity; and (4) programming IO node controllers and CPU node controllers based on the determined granularity to support all MMIO devices.

DETAILED DESCRIPTION OF THE PREFERRED EMBODIMENT

Figure 1:
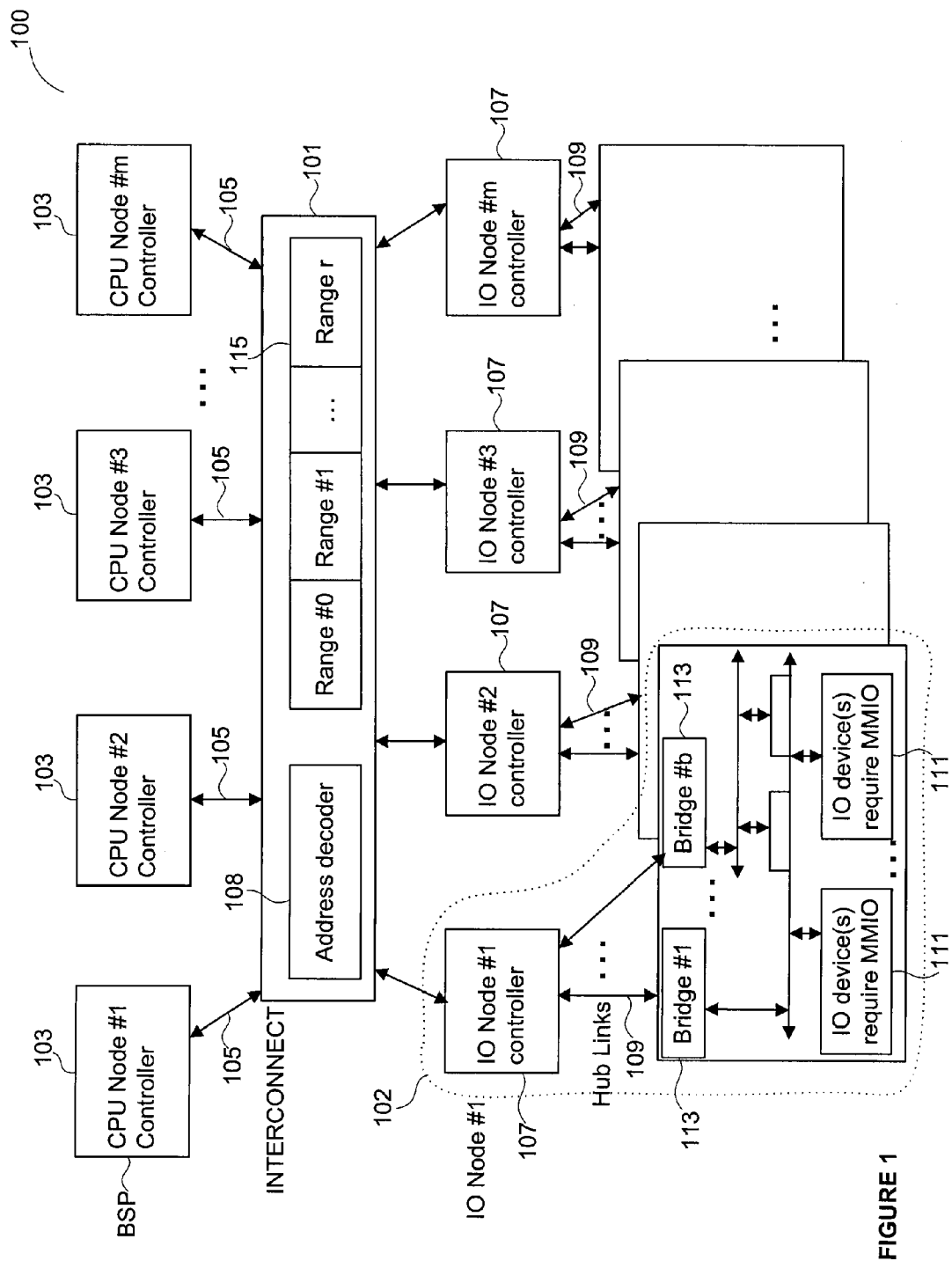
FIG. 1 is a schematic diagram illustrating an interconnect-based multi-node computer system in accordance with an embodiment of the present invention.

FIG. 1 illustrates a multi-node computer system 100 that typically contains a plurality of central processing units (CPU) node controllers 103 (#1, #2, #3, . . . #n), an interconnect 101, and a plurality of Input/Output (IO) nodes 102. The CPU nodes controllers 103 and the IO nodes 102 are all coupled to the interconnect 101. Typically, each of the CPU node controllers 103 is coupled to the interconnect 101 through a scalability port 105. A multi-node computer system 100 may also include multiple interconnects 101. Each of the interconnects 101 routes commands and data among different nodes and devices in the system 100. The details of an interconnect-based multi-node computer system are well known in the art, and are not included here to avoid obscuring a clear description of the present invention.

Within each IO node 102, there is typically included an IO node controller 107, and bridges 113 and IO devices 111. Different groups of IO devices 111 are respectively coupled to each of the bridges 113 (e.g., bridge #1, #2, . . . #b) and the bridges 113 are coupled to the IO node controller 107 through corresponding hub links 109. The IO devices 111 are conventional peripheral devices, such as PCI, SCSI type devices. In one embodiment, IO node 102 contains at least one MMIO device. IO nodes 102 may also be coupled to IO mapped IO devices depending on the operational needs of the system 100.

To support all MMIO devices 111 or other MMIO components in the system 100, the multi-node computer system 100 contains memory units, which may be distributed across the system 100 and globally accessible by all components 102, 103. To manage the address spaces provided by these memory units in the system 100, the interconnect 101 contains an address decoder 108 and a plurality of MMIO address range registers 115 as shown in FIG. 1. For example, with respect to MMIO devices 111, the MMIO address range registers 115 store the ranges of address space provided for MMIO devices 111 based on specific functions and ports.

The address decoder 108 typically receives read or write (r/w) requests from each IO node 102 during interaction between MMIO devices 111 and CPU node controllers 103. As a part of memory mapping process, the address decoder 108 determines from which MMIO device 111 the request comes based on the address range information stored in the MMIO address range registers 115, e.g., the range registers 0, 1, ... r. After the determination, the address decoder 108 can direct such request to corresponding CPU node controllers 103 for memory mapping processing.

One embodiment of the present invention provides a programmable range granularity value to manage the address spaces needed by the MMIO devices 111. The programmable granularity enables the system 100 to manage its memory space in various components 101, 102, 103 in a more efficient manner. For example, processors in the interconnect 101 are capable of writing to range registers 115 to adjust to a new granularity using reduced clock cycle time to improve the performance of the multi-node computer system 100.

Figure 2:
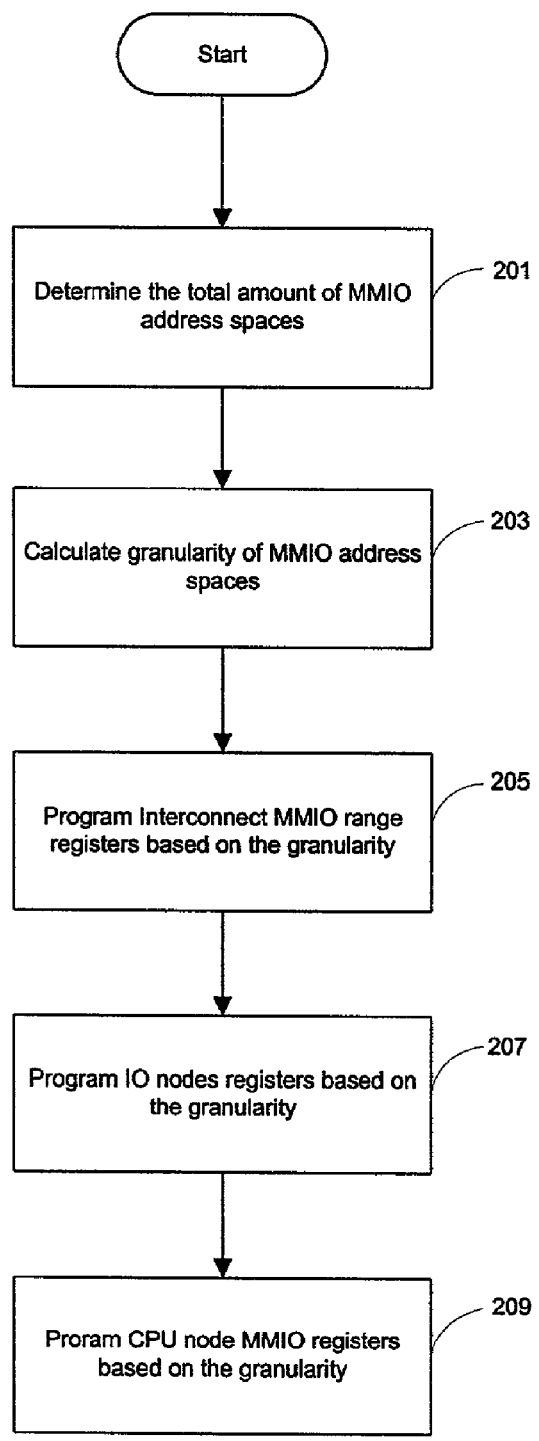
FIG. 2 is a flow chart illustrating a method for supporting MMIO address space requirement according to an embodiment of the present invention.

FIG. 2 is a flow chart illustrating a method for dynamically determining MMIO range granularity according to an embodiment of the present invention. The method can be performed by a bootstrap processor (BSP) in the system 100. During the initialization process of the system 100, one of the CPU node controllers 103 is designated as the BSP to execute the MMIO granularity determination process. When there are any changes of the number of MMIO devices 111 in the system 100, the BSP communicates with the interconnect 101 and IO node controllers 102 and other non-BSP CPU node controllers 103 to perform MMIO granularity determination routines as described herein through the scalability port 105. As described below in detail, the CPU node controller 103, acting as a BSP, scans IO nodes 102, determines the granularity of range registers 115 in the interconnect 101 and programs IO nodes 102 and CPU node controllers 103 to adjust to the new granularity to support MMIO devices.

According to one embodiment of the present invention, the BSP determines 201 the amount of MMIO address space required for all IO nodes 102. As will be further described with reference to FIG. 3, the amount of MMIO address spaces required for memory-mapped IO devices 111 within each IO node 102 is aggregated to generate the total amount of MMIO address space for the entire system 100. After the total amount of MMIO address spaces is determined, the BSP calculates 203 a proper granularity of the MMIO address space managed by the address range registers 115. In a preferred embodiment, the granularity may be an optimized value of the MMIO range granularity to support the found total MMIO address space requirement. The BSP 205 programs the range registers 115 in the interconnect 101 based on the granularity. The BSP proceeds to program 207 the MMIO registers used by the IO nodes 102 and to program 209 MMIO registers in CPU node controllers 103 based on the granularity.

Figure 3:
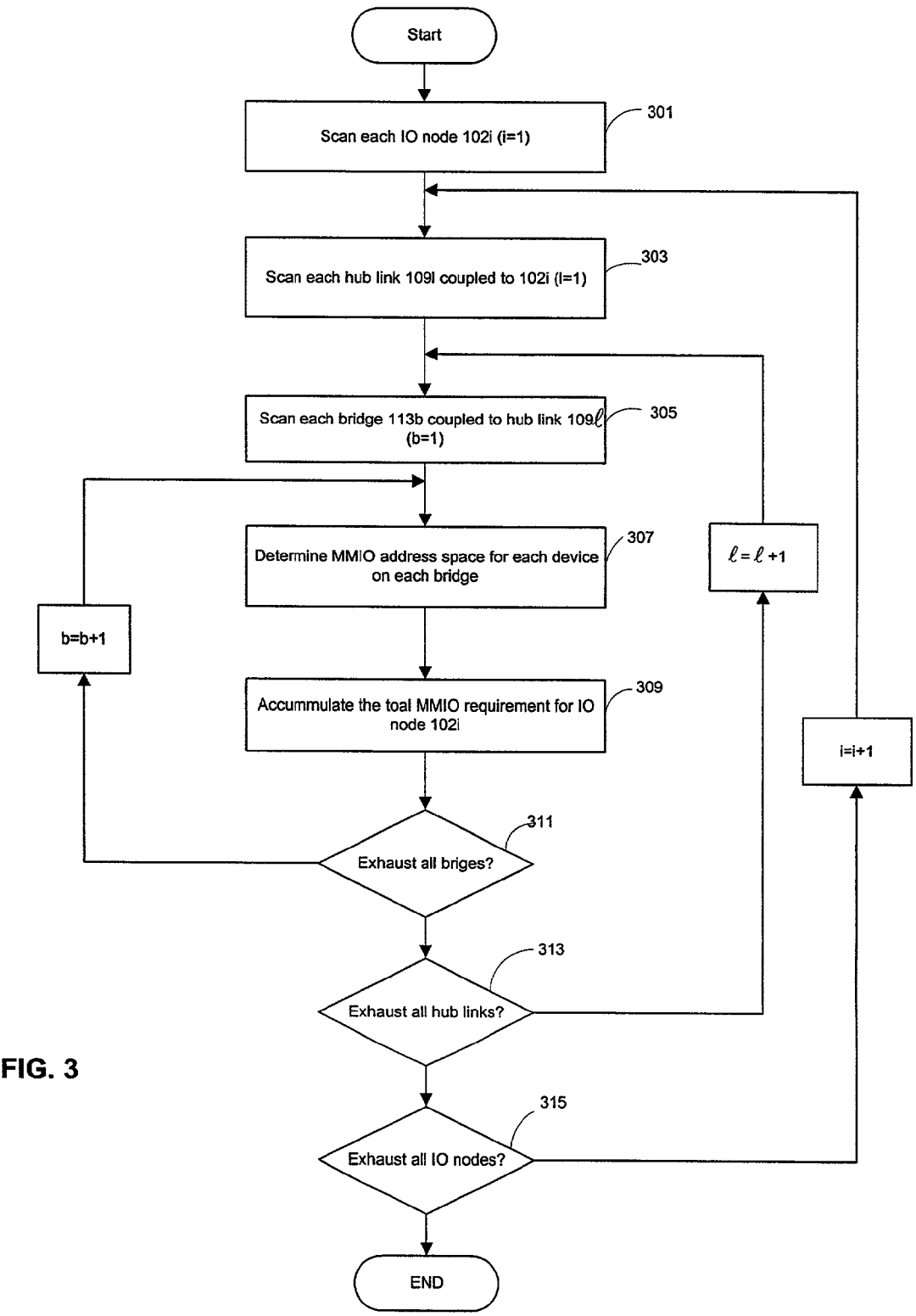
FIG. 3 is a flow chart illustrating a method for determining the total amount of MMIO address space requirement of a multi-node computer system.

FIG. 3 illustrates a method for determining the total amount of MMIO address space for the system 100. In one embodiment, the BSP scans all the MMIO devices 111 in the system 100 and aggregates the amount of MMIO address spaces that are needed for every MMIO device 111 within each IO node 102. The BSP starts this process by scanning 301 from any of IO node 102$i$ e.g., i=1. For each IO node 102$i$, the BSP scans 303 each hub link 109$l$ (e.g., l=1, ... n) that is coupled to an IO node controller 107$i$. For each hub link 109$l$, there is typically a bridge 113 coupling the IO devices 111 within the IO node 102$i$ to the IO node controller 107$i$. IO devices 111 are coupled to corresponding bridge 113$b$ (b=1, ... m). Thus, for each hub link 109, the BSP scans 305 each bridge 113$b$ in the IO node 102$i$ and then determines 307 the MMIO address space that are used by all MMIO devices 111 that are coupled to the bridge 113$b$. The BSP accumulates 309 the amount of MMIO address space for each IO node 102$i$. After all the devices 111 within an IO node 102$i$ are scanned, the BSP will continue to scan 315 next IO node 102$i$ to accumulate the MMIO size until it reaches the last MMIO device 111 at the last IO nodes 102$i$. As an implementation, the BSP stores the MMIO address space size for each IO node 102$i$ in an array IO_MMIOreqArray[i].

An example of the total MMIO amount determination is set forth in Appendix 1.

Figure 4:
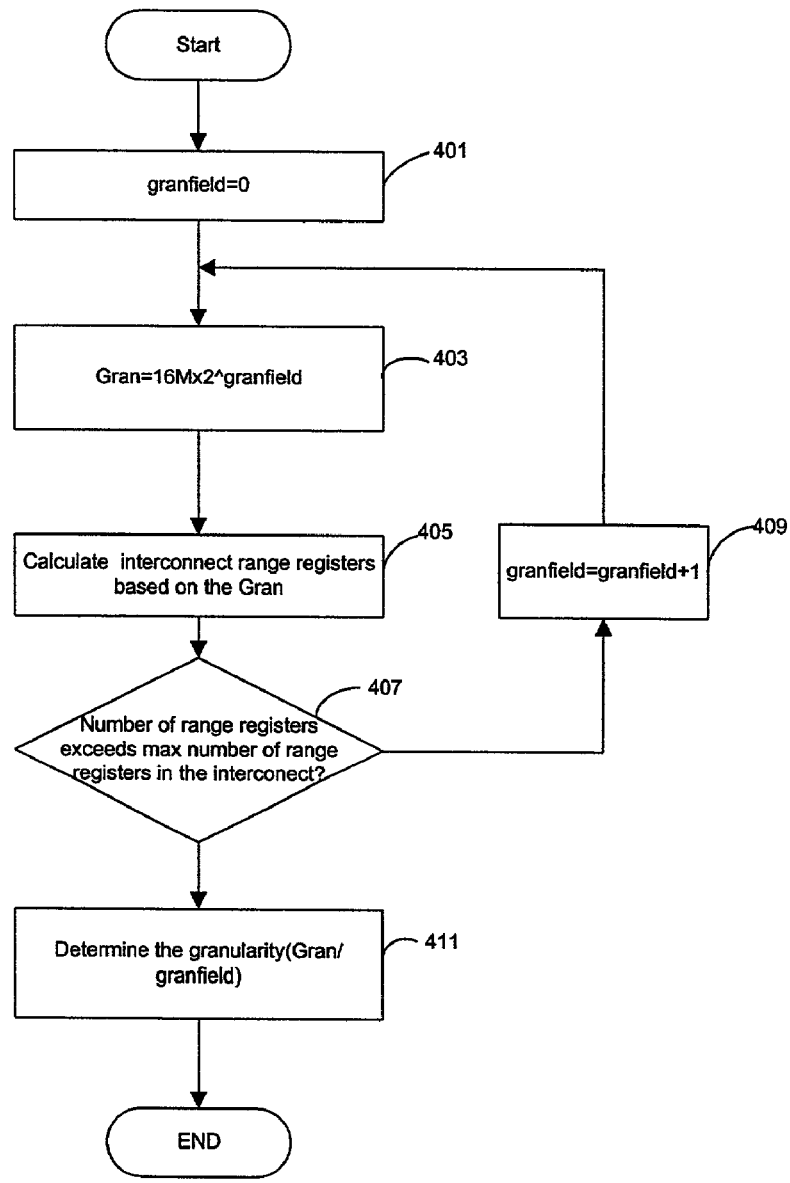
FIG. 4 is a flow chart illustrating a method for determining an optimized MMIO range granularity according to an embodiment of the present invention.

FIG. 4 illustrates a method for determining a granularity of the MMIO address spaces that are defined by range registers 115 in the interconnect 101. Upon determining the total amount of MMIO address space required by all MMIO devices 111, the BSP performs the steps as described below to determine a granularity of the total MMIO address spaces.

In one embodiment, the BSP stores a variable granfield and sets 401 the preliminary value of such granfield to be zero. As described below, the variable granfield will have a maximum value depending on the hardware capability of the system 100. The BSP defines a granularity size (Gran) of the MMIO address spaces as below:

$$\text{Gran} = 16 \text{ megabytes} \times 2^{\text{granfield}} \qquad \text{Equation (1)}$$

In one implementation, 16 megabytes in Equation (1) is a minimum address space size that is normally used by an MMIO device 111. In alternative embodiments, other values of address space sizes may be set depending upon the actual needs of the system 100. Based on the granularity value Gran determined by Equation (1), the BSP calculates 405 the number of the range registers that are needed to satisfy the total amount of MMIO address space requirement. In one implementation, the number of range registers that are needed for each IO node 102$i$ is calculated by:

$$\text{Number of range registers}[i] = \text{IO\_MMIOreqArray}[i] / \text{Gran} \qquad \text{Equation (2)}$$

Correspondingly, the total number of the range registers needed for all IO nodes 102 can be obtained by aggregating the results in Equation (2) for each IO node 102$i$. The total number of the range registers is subsequently compared 407 with the maximum number of the range registers that are currently provided by the interconnect 101. If it exceeds the maximum capability of the system 100, the BSP increases 409 the variable granfield by 1 and recalculates the new granularity value according to Equation (1). After the new granularity value is generated, the steps 403–407 are repeated until the number of range registers that are needed does not exceed the maximum hardware capability offered by the interconnect 101. As a result, the corresponding granularity value (Gran) is a preferred value of the granularity of the range size. Such granularity value will then be used to program the related MMIO firmware in the interconnect 101, CPU node controllers 103 and IO nodes 102.

An example of the granularity determination process is set forth in Appendix 2.

Referring back to FIG. 2, in a preferred embodiment, the BSP first programs the MMIO range registers in the interconnect 101 based on the granularity value derived at step 203. By way of example, the interconnect 101 typically contains MMIO registers specifying the starting address for memory-mapping a specific MMIO device 111 at a specific IO node 102i and the limit of MMIO address space that can be allocated for such MMIO device 111. The granularity determined from step 203 can then be used by the MMIO registers to define the starting address and corresponding length of address space for each MMIO device 111.

An example of programming the MMIO range registers in the interconnect 101 is set forth in Appendix 3. Note that since the system 100 can contain multiple interconnects, some of which can be non-default interconnects, the BSP can also program MMIO range registers in all of the interconnects included in the system 100.

Still referring to FIG. 2, having programmed the MMIO registers in the interconnect 101, the BSP also programs the MMIO registers in each IO node controllers 107i based on the determined granularity value. In one preferred embodiment, at each IO node controller 107i, there are MMIO registers, e.g., MMIOBL specifying the base address of MMIO address space, and MMIOLL, specifying the limit of the MMIO address space allocated by such IO node 102 for memory mapping. These MMIO registers can define the address spaces that are used for each specific MMIO device 111 that are coupled to specific hub links 109l. Based on the granularity value, the BSP can configure these MMIO registers in a uniform manner without the need of programming individually for each specific MMIO device. The determined granularity ensures that each MMIO device has sufficient address spaces that are allocated for memory mapping.

Correspondingly, the BSP also programs the MMIO registers in the CPU node controllers 103. Conventional CPU node controllers 103 also contain MMIO registers to define the starting address and size limits for address spaces that are used for memory mapping. The granularity value provides the limits for MMIO address space that are used by all MMIO devices. Thus, CPU node controllers 103 can use this information to configure its MMIO registers.

An example of programming the MMIO registers in IO node controllers 107 and CPU node controllers 103 is set forth in Appendix 4.

In summary, the present invention provides a method and system to support dynamic changes in the MMIO address spaces that are used by MMIO devices in a multi-node computer system. The present invention determines a proper granularity value of the total amount of MMIO address spaces and uses the granularity value to program corresponding MMIO registers in the various components of the computer system. In doing so, the present invention avoids the complexity and inefficiency of configuring MMIO registers for specific MMIO devices as the number of MMIO devices changes. Further, the determination of granularity of MMIO address spaces enables an efficient use of the memories of a multi-node computer system.

APPENDIX 1

Step 1. Determine the amount of MMIO space needed for all IO nodes
Input: numIOnodes
Output:

```
IO_MMIOreq IO_MMIOreqArray [MAX_IO_NODES];
struct  IO_MMIOreq  {IOCrldevnum;  HL_MMIOreq
    [MAX_HL]; numIntrConnRanges ;MMIOsize;//in bytes//
};
struct HL_MMIOreq {MMIOsize; //in bytes//};
MAX_IO_NODES=23
MAX_HL=4
initialize IO MMIOreqArray [numIOnodes]={0};
for(i=0; I<numIOnodes; i++)
{   IO   MMIOreqArray[i].   IOCtrldevnum=IOCtrl[i].NO-
    deID
    for(1=0; 1<MAX HL; 1++)
        for(b=IOCtrl[I].BUSNO[1];   b<IOCtrl[I].BUSNO[1+
            1]-1; b++)
        {   if there is no IO under this bus continue;
            scan the entire device all MMIO requirement
            accumulate  this  size  in  IO_MMIOreqArray[i]
                .MMIOsize
        }//for(b= . . . )
        round  up  IO_MMIOreqArray[i].  HL_MMIOreq[1]
            .MMIOsize to 16M
    }//for(1=; . . . )
    IO_MMIOreqArray[i].MMIOsize+=IO_MMIOreqArray
        [i].HL_MMIOreq[1].MMIOsize;
}//for(i=0; . . . )
//We have the MMIO address requirement for all the hub
    links of all the IO nodes in IO_MMIOreqArray
//as a multiple of 16M
```

APPENDIX 2

Step 2A. Determine the granularity
Input
// // gran is the granularity.granfield must be <4 as per interconnect spec

```
MAX_MMIO_RANGE=32
interconnect_MMIO_ENTRY_ENABLE=TRUE
granfield=0; //0=>16M
do{
    numranges=numIntrConns;
    doneflag=FALSE;
    gran=16M*2^granfield;
    for(i=0; i<num-IOHs; i++)
        {IO_MMIOreqArray[i].numIntrConnRanges=(IO_M-
            MIOreqArray[i].MMIOsize)/gran;
        if(IO_MMIOreqArray[i].MMIOsize % gran){
            IO_MMIOreqArray[i].numIntrConnRanges++;
        }
        numranges+=IO_MMIOreqArray[i].numIntrCon-
            nRanges;
        if(numranges>MAX_MMIO_RANGE){
            granfield++;
            doneflag=FALSE;
            break;
        }
        doneflag=TRUE;
    }
}while(doneflag==FALSE);
```

APPENDIX 3

Step 2B: Program the interconnect MMIO registers
Input: gran; IOH_MMIOreqArray[MAX_IOH]; numIntr-Conns, numIOHs
Output: IntrConn.C_MMIOLM, IntrConn.C_MMIOLD
//Create mapregarray[32] based on
   gran mapregarray[32]={1d, 1c, . . . , 0, 1f, 1e} for gran=16M
mapregarray[32]={1e, 1d, 1c, . . . , 0, 1f} for gran=32M
mapregarray[32]={1f, 1e, 1d, 1c, . . . , 0} for gran=64M
mapregarray[32]=}1f, 1e, 1d, 1c, . . . , 0} for gran=128M
for(c=0; c<numIntrConns; c++)
{  for(fun=0; func>6; func++)
  {  if(SP[func]!=IN_DOMAIN) continue;
    IntrConn[c].C_MMIOLD[func].EntrySize=granfield;
    m=0; //0<=m<=31 in every func
    //Do for all the non-default IntrConns
    for(s=0; s<numIntrConns; s++)
    {  if(defaultIntrConn(c)-=TRUE) continue;
      IntrConn[c].C_MMIOLM[func][mapregarray[m]]
        .NodeID=
        IntrConn[s].C    CBS[getfuncinmydomainfor(s)]
          .NodeID
      IntrConn[c.C_MMIOLM[func][mapregarray[m]].
        enable=
        IntrConn_MMIO_ENTRY_ENABLE;
      m++;
    }//for(s=0; . . . )
    //Do for all the defaultIntrConns
    for(s=0; s<numIntrConns; s++)
    {  if(defaultIntrConn(c)!=TRUE) continue;
      IntrConn[c].C_MMIOLM[func]8 mapregarray[m]]
        .NodeID=
        IntrConn[s].C    CBC[getfuncinmydomainfor(s)]
          .NodeID
      IntrConn[c].C_MMIOLM[func][mapregarray[m]]
        .enable=
        IntrConn_MMIO_ENTRY_ENABLE;
      m++;
    }//for(s=0;)
    for(i=0; i<numIOnodes; i++)
    {  for(r=0;  r<IO    MMIOreqArray[i].numIntrCon-nRanages; r++)
      {  if(defaultIntrConn(c)=TRUE)
        //this region to be enabled in default interconnect
        {  IntrConn[c].C_MMIOLM[func][mapregarray
          [m] .NodeID=
            IO_MMIOreqArray[i].IOHdevnum
            IntrConn[c].C_MMIOLM[func][mapregar-ray[m]],enable=
            Intr_MMIO_ENTRY_ENABLE;
        }
        else //this region to be enabled in non-default interconnect
        {  IntrConn[c].C_MMIOLM[func][mapregarray
          [m]].enable=
            IntrConn_MMIO_ENTRY_DISABLE;
        }
      }//for(r=0; . . . )
    }//for(i=0; . . . )
  }//for(func=0; . . . )
}//for(c=0; . . . )

APPENDIX 4

Step 3. Program all the IO controllers' and all the CPU node controllers' MMIO regs
Input:   gran;   IO_MMIOreqArray[MAX_IO_NODES]; numIntrConns, numIOnodes
Output: IO[all].MMIOBL, IOH[all].MMIOLL, IOH[all] .MMIOSL[5:0]
   CPU_Node_Ctrl[all].MMIOL,    CPU_Node_Ctrl[all] .MMIOH, CPU_Node_Ctrl[all].MMIOL,
io_mmio_begin=FDFF FFFF // Just below SAR
IO[all].MMIOLL=io_mmio_begin
io_hl_current=io_mmio_begin-gran*numIntrConns;
for(i=0; i<MAX-IO-NODES; i++) {
  for(1=0; 1<MAX HL; 1++){
    IO[IO_MMIOreqArray[i].IOCtrldevnum].MMIOSL
      [1]=io_hl_current;
    io_hl_current=gran*IIO_MMIOreqArray[i].HL_M-MIOreq[I].MMIOsize;
  }//for(1=0 . . . )
  IO[IO_MMIOreqArray[i].IOCtrldevnum].MMIOSL[1]
    =Ioh_hl_current;
}
io_hl_end=io_hl_current;
for(i0; i<numIOnodes; i++){
  IO[IO_MMIOreqArray[i].IOCtrldevnum]
    .MMIOLL=io_mmio_begin;
  IO[IO_MMIOreqArray[i].IOCtrldevnum]
    .MMIOBL=io_hl_end;
}
for(n=0; n<numCPUnodes; n++){
  CPU_Node_Ctrl[n].MMIOL=ioh_hl_end;

What is claimed is:

1. A method for supporting memory mapped input output (MMIO) devices in a multi-node computer system, the multi-node computer system comprising an interconnect having a number of MMIO address space range registers, a plurality of central processor unit (CPU) nodes, a plurality of input output (IO) nodes, each IO node including at least an MMIO device, the method comprising:
   dynamically determining a total amount of MMIO address spaces that are used by the multi-node computer system in response to a change in number of the MMIO devices;
   and determining a granularity of the MMIO address spaces based on the number of the MMIO address space range registers;
   and programming a range size stored in the range registers of the interconnect based on the determined granularity.

2. The method of claim 1, further comprising:
   configuring the IO nodes based on the determined granularity to support the MMIO device.

3. The method of claim 2, further comprising:
   configuring the CPU node based on the determined granularity to support the MMIO device.

4. The method of claim 1, wherein determining a total amount of MMIO address spaces comprises:
   scanning each of MMIO devices that are included in each IO node;
   determining the amount of MMIO address spaces that are needed by the MMIO device; and
   generating the amount of MMIO address spaces that are needed by all the MMIO devices that are included in the computer system.

5. The method of claim 1, wherein determining a granularity of the MMIO address spaces comprises:
generating a preliminary granularity value;
generating the number of range registers based on the preliminary granularity value;
comparing the generated number of range registers with the maximum number of the range registers that is provided by the system; and
generating a proper granularity of the MMIO address spaces based on the maximum number of the range registers.

6. A computer system comprising:
an interconnect having a number of memory mapped input output (MMIO) address space range registers;
a plurality of input output (IO) nodes operatively connected to the interconnect, each IO node including at least one MMIO device; and
a plurality of central processor unit (CPU) nodes, operatively connected to the interconnect, with at least one of the CPU nodes being configured to dynamically determining a total amount of MMIO address spaces that are used by the computer system in response to a change in number of the MMIO devices, and the CPU node being further configured to determine a granularity of MMIO address spaces need to support all MMIO devices of the IO nodes based on the number of the MMIO address space range registers, the CPU node being further configured to program a range size stored in the MMIO address space range registers based on the determined granularity.

7. The system of claim 6, wherein the at least one of the CPU nodes is configured to program the IO nodes based on the determined granularity to support the MMIO device.

8. The system of claim 7, wherein the at least one of the CPU nodes is configured to program the CPU nodes based on the determined granularity to support the MMIO device.

9. A computer readable medium containing a computer program for enabling the support of memory mapped input output (MMIO) devices in a multi-node computer system, the multi-node computer system comprising an interconnect having a number of MMIO address space range registers, a plurality of central processor unit (CPU) nodes, a plurality of input output (IO) nodes, each IO node including at least an MMIO device, said computer program, when executed by one of the plurality CPU nodes, performing the method of:
dynamically determining a total amount of MMIO address spaces that are used in the multi-node computer system in response to a change in number of the MMIO devices; and
determining a granularity of the MMIO address spaces based on the number of the MMIO address space range registers;
programming a range size stored in the range registers of the interconnect based on the determined granularity;
configuring the IO nodes based on the determined granularity to support the MMIO device; and
configuring the CPU node based on the determined granularity to support the MMIO device.

10. A computer system comprising:
an interconnect having a plurality of memory mapped input output (MMIO) address space range registers;
a plurality of input output (IO) nodes, coupled to the interconnect, each IO node including at least an MMIO device;
a plurality of central processor unit (CPU) nodes, coupled to the interconnect; means for dynamically determing a total amount of MMIO address spaces that are used in the computer system in response to a change in number of the MMIO devices, and menas for determining a granularity of the MMIO address spaces that are need to support all MMIO devices of the system based on the number of the MMIO address space range registers; and menas for programming a range size stored in the MMIO address space range registers based on the determined granularity.

11. The system of claim 10, further comprising:
means for configuring the IO nodes based on the determined granularity to support the MMIO device.

12. The system of claim 11, further comprising:
means for configuring the CPU node based on the determined granularity to support the MMIO device.

* * * * *

UNITED STATES PATENT AND TRADEMARK OFFICE
CERTIFICATE OF CORRECTION

PATENT NO. : 7,213,081 B2  Page 1 of 1
APPLICATION NO. : 10/122043
DATED : May 1, 2007
INVENTOR(S) : Prabhunandan B. Narasimhamurthy et al.

It is certified that error appears in the above-identified patent and that said Letters Patent is hereby corrected as shown below:

Column 10,

Line 3, add --of-- between "plurality" and "CPU"

Line 27, replace "menas" after "and" with --means--

Line 31, replace "menas" after "and" with --means--

Signed and Sealed this

Third Day of July, 2007

JON W. DUDAS
*Director of the United States Patent and Trademark Office*